Fig. 2

United States Patent Office 3,002,403
Patented Oct. 3, 1961

3,002,403
CONTROLS FOR DRILLING MACHINES
AND THE LIKE
Mark R. Estabrook, Rockford, Ill., assignor to Barnes
Drill Co., Rockford, Ill., a corporation of Illinois
Filed May 13, 1958, Ser. No. 734,891
8 Claims. (Cl. 77—32.2)

The present invention relates in general to machine tools and in particular to the control of machine tools in which a movable element is successively positioned according to numerical information read from a digital record. While not so limited in its applications, the invention finds advantageous use in horizontal drilling machines wherein the drill spindle is automatically advanced and retracted to drill a hole in a workpiece after each relative positioning of the drill head and workpiece.

It is the general aim of the invention to eliminate the possibility and inconvenience of a positionable element moving from one position to the next before a machine tool has completed a desired machining operation with the element in the first position.

In this connection, it is an object of the invention to prevent the destruction of one set of positioning information, which has been read from a record and stored, before an operating element of a machine tool has completed its working motion, and even though such working motion is interrupted and subsequently re-started.

A further object of the invention is to eliminate the time-consuming need to back up, relocate, and re-read a portion of a record which designates the position a machine tool element is to have during a machining operation, if for some reason such as cutter breakage, that operation is interrupted while in progress.

Still another object is to effect fool-proof sequencing in numerical positioning controls for a machine tool by mechanically latched means which are insensitive to loss of voltage supply or total shut-down of the machine.

Other objects and advantages will become apparent as the following description proceeds, taken in conjunction with the accompanying drawings, in which.

While the invention has been shown and will be described in some detail with reference to a particular, exemplary embodiment, there is no intention that it thus be limited to such detail. On the contrary, it is intended here to cover all modifications, alterations and equivalents falling within the spirit and scope of the invention as defined by the appended claims.

Figure 1:
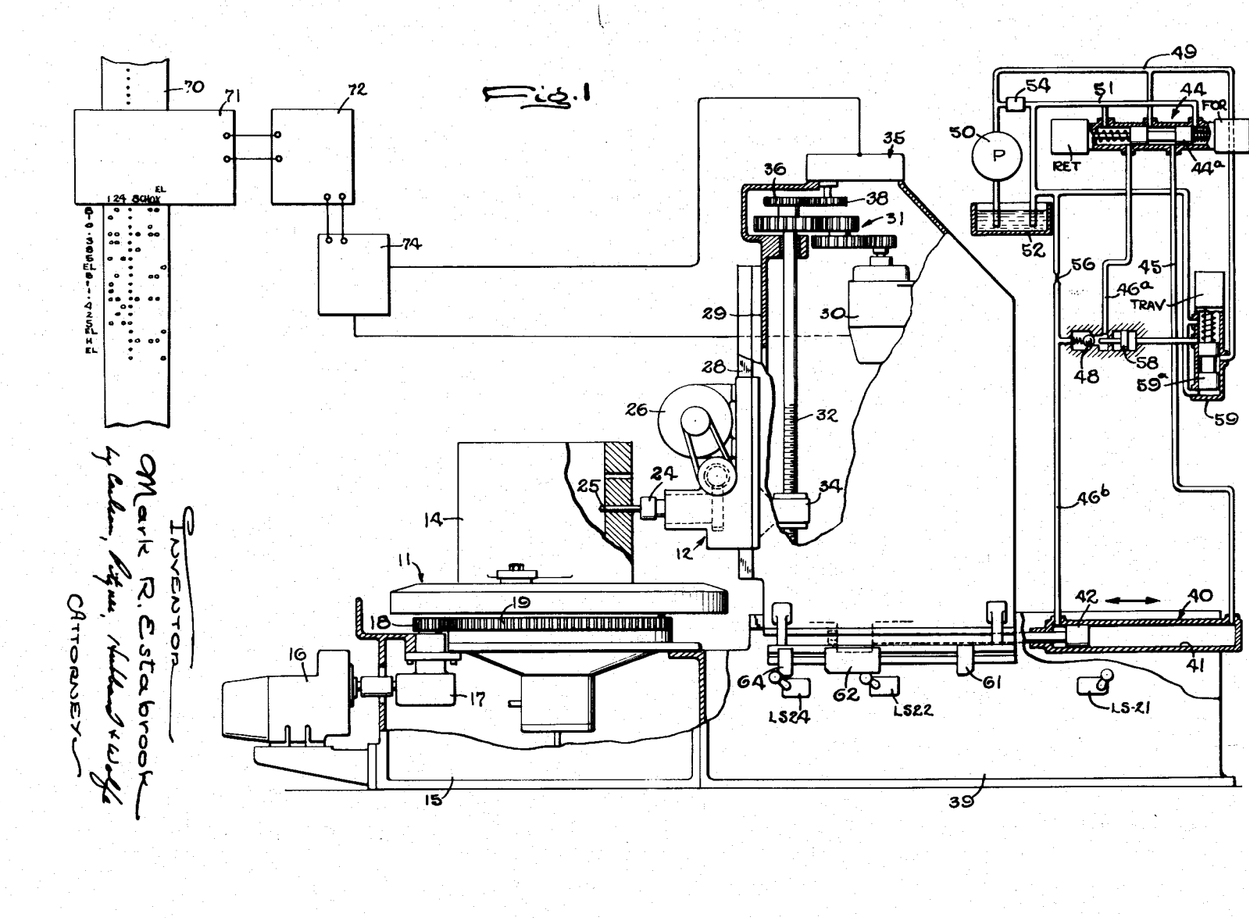
FIGURE 1 is a diagrammatic illustration of an exemplary machine tool (partly in section) together with associated electric and hydraulic controls therefor.

Referring now to FIG. 1, the machine tool here shown by way of example is a horizontal drilling machine 10 which comprises first and second positionable elements in the form of a work support or table 11 and a drilling head 12. The work table 11, here shown as supporting a cylindrical workpiece 14, is journaled for rotation about a vertical axis on a base 15. The table may be moved to different angular positions by drive from a table motor 16 through reduction gearing 17, a pinion 18 and a ring gear 19.

The drill head 12 journals a spindle 24 adapted to hold a cutting tool or bit 25 and driven through appropriate gearing from a spindle motor 26. The entire head 12 is movable along vertical ways 28 formed on a column 29. It is raised or lowered to any desired vertical position by an elevating motor 30 working through gearing 31 and a vertical lead screw 32 which is engaged by a nut 34 rigid with the head. For electrically indicating the angular rotation of the lead screw 32, and thus the vertical position of the head 12, a synchro or "selsyn" device 35 is driven in timed relation to the screw through gears 36 and 38. The selsyn device 35 forms a part of a servo control syestem for governing the motor 30 to move the head 12 to different vertical positions defined in the first instance by numerical information digitally represented on a record.

The column 29 forms a reciprocatable operating element of the machine tool. That is, the column is movable back and forth along ways of a bed 39 so as to advance the bit 25 toward and into the workpiece 14, and to retract the bit from the workpiece so that the table 11 and the head 12 can be re-positioned to determine the location of the next hole to be drilled.

As here illustrated, the reciprocating movement of the operating element or column 29 is effected by a double-acting hydraulic actuator 40 made up of a cylinder 41 fixed to the bed 39 and containing a position 42 having its rod fixed to the column. The actuator 40 is controlled as to its direction of motion by a four-way valve 44 having a spring-centered plunger 44a movable in a ported casing and associated with forward and return solenoids FOR and RET. The valve 44 connects with conduits 45 and 46a, 46b leading to the opposite ends of the cylinder 41, the latter two conduits communicating through a ball check valve 48 which normally lets fluid pass only into the left end of the cylinder. On the other hand, the valve 44 connects with a pressure conduit 49 leading from the fluid pressure source or pump 50, and to a return conduit 51 which leads to a fluid sump 52. The output pressure of the pump 50 is maintained substantially constant by a relief valve 54 leading back to the conduit 51 and the sump 52.

When the forward solenoid FOR is energized, the plunger 44a will be shifted to the right (as shown in FIG. 1), so that the right end of the cylinder 41 receives pressure fluid from the pump 50 through the conduits 49 and 45. The left end of the cylinder 41 communicates through the conduit 46b and a restricting orifice 56 with the sump 52. Due to that orifice restricting the rate of fluid flow, the piston 42 will advance the column 29 toward the workpiece 14 at a slow or feed rate.

To enable the column 29 to be advanced at a rapid traverse rate, a small actuator piston 58 is associated with the check valve 48. Pressure fluid is either supplied to or vented from the right side of the piston 58 when the plunger 59a of a valve 59 is respectively biased downwardly by a spring, or shifted upwardly in response to energization of an associated traverse solenoid TRAV. When the solenoid TRAV is energized to move the plunger 59a upwardly, pressure fluid from the conduit 49 is supplied to the right side of the piston 58. That piston is shifted to the left so that its rod unseats the ball of the check valve 48 and holds the latter valve open. With this, fluid can pass freely from the left end of the cylinder 41 through the conduit 46b, the valve 48, to the conduit 46a, and thence through the valve 44 to the return conduit 51, by-passing the restricting orifice 56.

Thus, when both the FOR and TRAV solenoids are energized, column 29 will be advanced at a rapid traverse rate with fluid from the left end of the cylinder 41 returning through the conduits 46b, 46a and the valve 44 to the conduit 51 and the sump 52.

On the other hand, when the valve plunger 44a is shifted to the left in response to energization of the return solenoid RET, it connects the fluid pressure conduit 49 to the conduit 46b through the conduit 46a and the check valve 48. The pressure fluid can flow freely from the pump 50 to the left end of the cylinder 41. Also, the valve plunger 44a connects the right end of the cylinder 41 and the conduit 45 to the fluid return conduit 51 and the sump 52. With this, the piston 42 and the column 29 are retracted at a rapid traverse rate. It will be apparent that when the return solenoid RET is energized, the retracting motion of the column will always be at a traverse rate whether or not the traverse solenoid TRAV is energized. Also, when neither of the solenoids FOR and RET is energized, the plunger 44a will be centered and the column 29 held stationary.

Figure 3:
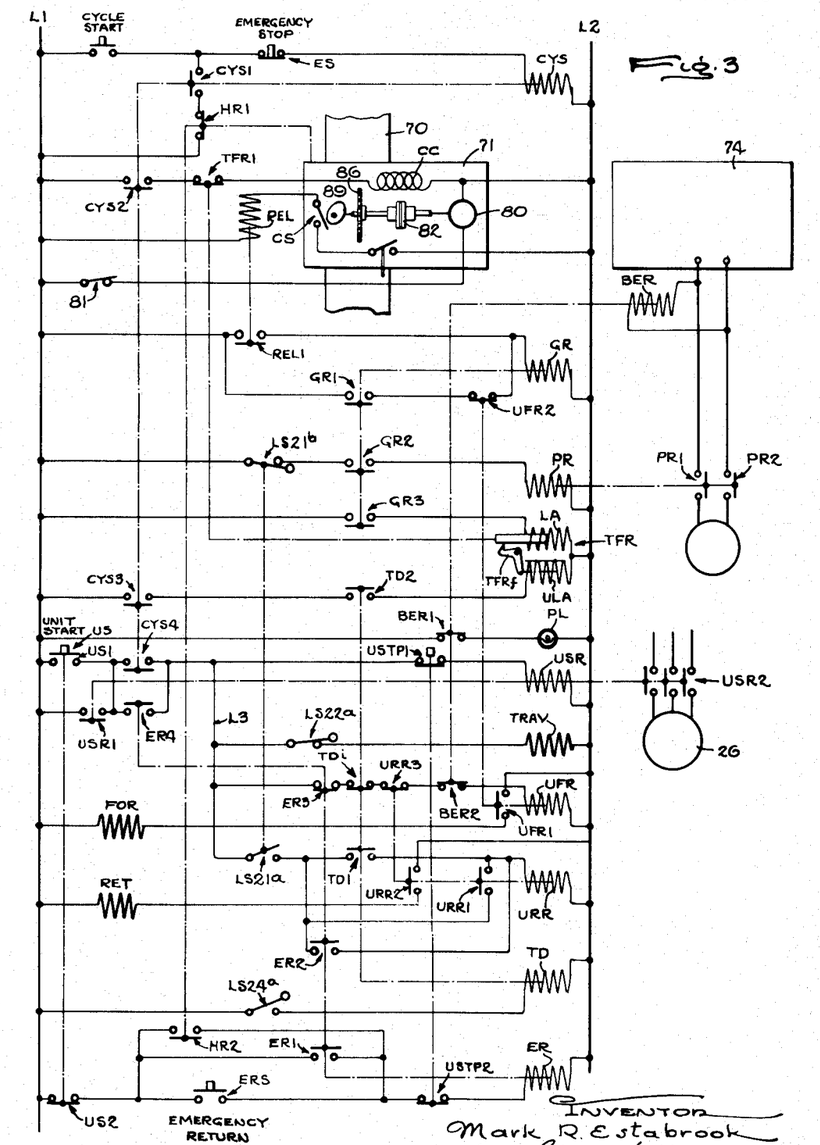
FIG. 3 is a schematic electrical diagram of the exemplary control means associated with the apparatus of FIGS. 1 and 2 for accomplishing the objects of the invention.

For a purpose to be made clear below, the complete retraction of the column 29 to its home position is sensed by a limit switch LS21 mounted on the base 39 and disposed to be actuated by a dog 61 movable with the column 29. When the column 29 is fully retracted, the contacts LS21a and LS21b of that limit switch will be actuated, i.e., respectively opened and closed as illustrated in FIG. 3.

The point in the forward motion of the column 29 at which its velocity is to be reduced from rapid traverse to a feed rate is determined by a limit switch LS22 mounted on the base 39 and cooperatively associated with a dog 62 carried by the column. After the column has advanced through a predetermined distance from its home position, the dog 62 will actuate the limit switch LS22, thereby opening the normally closed contacts LS22a (FIG. 3).

Figure 2:
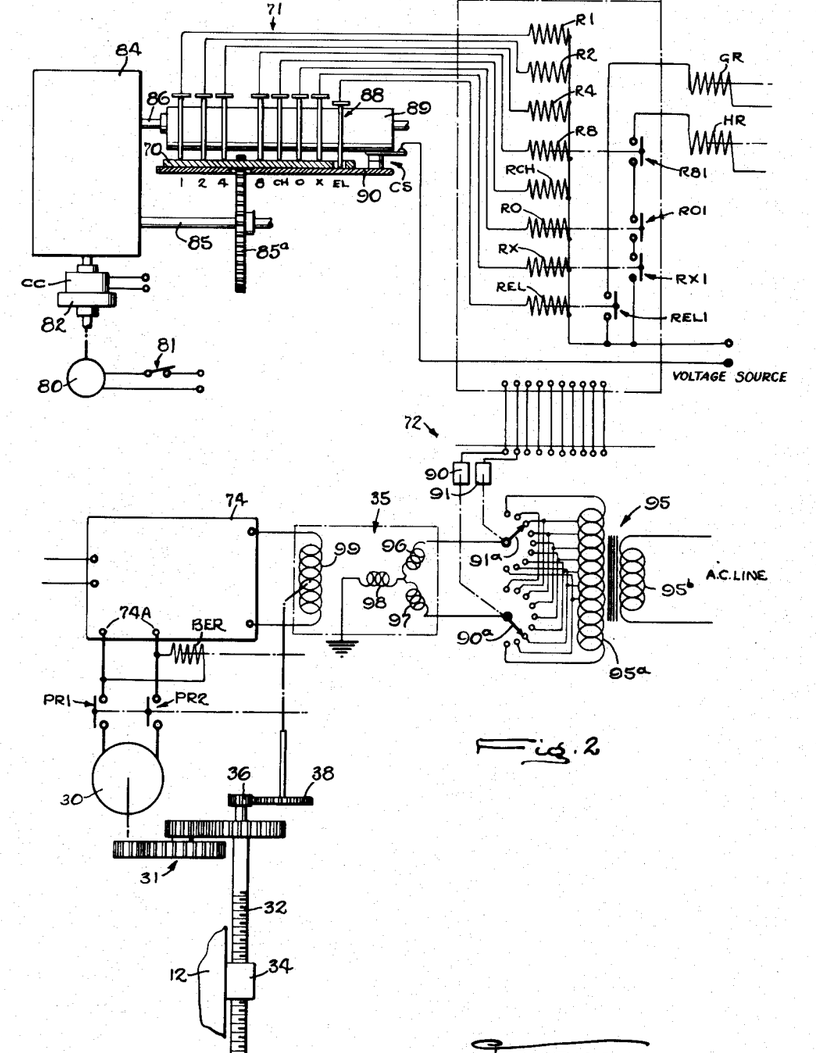
FIG. 2 is a diagrammatic representation of an exemplary system for reading numerical information from a digital record, and positioning a movable element in accordance with such information.

To signify when the column has fully advanced, i.e., that the drill bit 25 has penetrated to the desired full depth, a third limit switch LS24 is mounted on the bed 39 and disposed to be actuated by a dog 64. When the column has fully advanced through one working stroke, the dog 64 will actuate the switch LS24, thereby closing its normally open contacts LS24a (FIG. 2).

In the present system, the drilling bit 12 is moved to successive vertical positions which are defined in the first instance by successive sets of numerical information digitally represented on a record device. The record device is there shown as a punched pape tape 70 (FIG. 1) divided into eight longitudinal columns assigned the characters 1, 2, 4, 8, CH, 0, X, and EL. Within a given row across the tape 70, holes are punched which by their combination represent, according to a predetermined code, different numbers and characters.

For purposes of simplicity, only two "blocks" of information, numerically designating two successive positions for the head 12, are shown punched in the tape 70. The first block contains eight rows of punched holes which by the combination of holes in each row represent the characters "B10.385EL." The character "B" indicates that the following numbers designate a head position (rather than a table position). The numbers 10.385 indicate that the head is to be moved to a position 10.385 inches from a given reference point. The last character of the block, EL, designates the end of the block.

In like manner, the second block of digitally represented numerical information on the punched paper tape 70 reads "B11.425EL," and indicates that the head 12 is to be moved, after machining operations are completed at the first position, to a second position displaced 11.425 inches from the reference point. As many blocks of information may be placed on the tape 70 as might be desired in order to successively locate the head 12 at different vertical positions for the drilling of precisely vertically located holes in the workpiece 14. When the end of the complete machining operation is reached, i.e., all of the desired holes have been drilled, this is signified on the punched paper tape by an "end-of-run" code H followed by the end-of-block code EL.

To utilize the information from the punched paper tape 70, it is threaded through a punched tape reader 71 as shown in FIG. 1. This reader senses successively each row of punched holes in a block of information, and stops when one complete block has been read. In the process of reading a block of information, the reader 71 supplies electrical signals to a storage device 72 which is conditioned so as to represent and hold the information which has been read from the tape. The storage device 72, in turn, cooperates with a servo amplifier 74 which energizes the elevating motor 30 to drive the lead screw 32 in one direction or the other until the signal from the selsyn device 35 indicates that the position of the head matches that designated by the stored numerical information.

Referring in more detail to FIG. 2, the punched tape reader 71 includes a driving motor 80 which may be assumed to be continuously energized from a suitable voltage source through a closed switch 81. The motor works through a clutch 82 selectively engaged by energization of a clutch coil CC to drive a transmission 84 having output shafts 85 and 86. The output shaft 85 carries a sprocket 85a engaged with the column of sprocket holes in the paper tape 70, and is intermittently rotated to advance the tape longitudinally, one row at a time, past eight contact fingers 88. The shaft 86, on the other hand, is continuously driven, so long as the clutch 82 is engaged, and carries a cam 89 which holds each of the contact fingers 88 elevated above the tape 70 except when the sprocket 85a is stationary and the tape 70 has been brought to a halt with a row of holes disposed beneath those contact fingers.

As the contact fingers 88 are lowered by the cam 89, those particular ones which are disposed opposite holes in the tape will make electrical contact with a conductive plate 90 connected through a cam switch CS to one side of a voltage source. The cam switch CS is controlled by the cam 89 such that it will be momentarily closed after all of the contact fingers 89 have been lowered to project through holes in the tape 70, if such holes are present beneath the individual fingers.

Each of the eight contact fingers 88 is connected in circuit with a corresponding one of eight relays to the opposite sides of the voltage source. Because these eight relays are respectively and momentarily energized whenever a punched hole appears in a corresponding column of the punched tape 70, they are identified by the column characters preceded by the distinguishing prefix "R." The relays thus are shown in FIG. 2 as R1, R2, R4, R8, RCH, R0, RX, and REL. It should be observed at this time that the relay REL has normally open contacts REL1 connected in circuit with an auxiliary relay GR, so that when the tape reader 70 reads the character "EL" at the end of a block of information, the relay GR can be momentarily energized. Further, the relays RX, R0, and R8 have normally open contacts RX1, R01 and R81 all connected in series with an "end-of-run" relay HR, so that the latter will be momentarily picked up whenever the H code, i.e., holes in columns, X, 0 and 8, appears in the punched tape 70.

As the punched tape reader 71 reads one complete block of numerical information from the tape 70, the relays R1 through REL in FIG. 2 will be successively momentarily energized in various combinations according to the digitally represented information on the tape. This successive energization of the relays in different combinations is caused, by means which are well known and need not be shown in detail, to energize the coils of a plurality of stepping switches which are thus conditioned to represent and store the numerical information. In the interest of brevity, only the coils 90 and 91 of two stepping switches having contact arms 90a and 91a have been shown in the drawings. Those contact arms are stepped to unique positions which correspond to the numerical information which has been read. The physical positions of the contact arms 90a and 91a (and others not shown) thus represent and "store" numerical information which has been read from one block of the punched tape 70.

In order to convert the positions of the stepping switch arms 90a and 91a into an analogue signal which corresponds to the numerical value of the desired position for the drill head 12, those arms are arranged to engage different taps connected to the secondary winding 95a of a transformer 95 having its primary winding 95b connected to a suitable alternating voltage source. The contact arms 90a and 91a lead to two stator windings 96, 97 of selsyn device 35, those windings being Y-connected with a third stator winding 98 connected at its extremity to ground. The phase of the A.C. voltages supplied to the stator windings 96–98, therefore, depends upon the particular positions to which the contact arms 90a, 91a have been set. Thus the phase of the A.C. excitation of the stator windings, relative to the reference phase of the alternating line voltage, constitutes an analogue representation of the desired position to which the head 12 is to be moved.

As is well known, the rotor winding 99 and the selsyn device 35 will have no voltage induced therein when that rotor winding is moved to a unique angular position for a given phase of the alternating voltages applied to the stator windings. If the rotor 99 is angularly mismatched, then an error voltage will be induced therein which is proportional in amplitude to the magnitude of the error, and which is either in phase or displaced 180° in phase from the line voltage depending upon whether that error is in one direction or the other. The rotor winding 99 is angularly positioned relative to the stator windings 96–98 by mechanical connection to the gear 38, as previously described. The rotor winding 99 is electrically connected to the input terminals of the servo amplifier 74 which may be of conventional, well-known organization. The servo amplifier 74 operates to supply a D.C. signal at its output terminals 74a which is proportional in magnitude to the amplitude of the alternating error signal, and which is of one polarity or the other depending upon the sense of the error signal induced in the selsyn rotor winding 99.

Assuming that the contacts PR1 and PR2 in FIG. 2 have been closed, the output terminals 74a of the servo amplifier 74 will be connected to the input of the head-elevating motor 30. The latter motor in this instance is a D.C. motor which will be energized and run at a speed proportional to the magnitude of the D.C. voltage supplied thereto, and in a direction corresponding to the polarity of that D.C. voltage. Such energization of the motor 30 will drive the elevating screw 32 through the gearing 31, thus shifting the drill head 12 upwardly or downwardly. The elevating screw is also connected to the rotor of the selsyn device 35 through the gears 36, 38, so that as the motor 30 drives the head toward the desired position, the error signal induced in the rotor winding 99 will be reduced. When the motor 30 has driven the head 12 to the desired position represented by the setting of the contact arms 90a, 91a, then the error signal induced in the rotor winding 99 will be reduced to zero amplitude, and the output signal appearing at the terminals 74a of the amplifier 74 will be reduced to zero. Accordingly, the motor will stop with the head in the desired vertical position.

Of course, if the stepping switch arms 90a, 91a are moved to different taps in response to reading of the second block of information, the phase of the excitation applied to the selsyn stator windings 96–98 will be changed, so that an error signal will again be induced in the rotor winding 99, causing the amplifier 74 to energize the motor 30 to drive the drill head 12 toward a new position. When that position is reached, the signal induced in the rotor winding 99 is again reduced to zero.

The normally open relay contacts PR1 and PR2 shown in FIG. 2 are utilized to prevent the motor 30 from operating except under certain conditions, as will be explained more fully below. Also, a sensitive error relay BER is shown connected across the output terminals 74a of the servo amplifier 74. This latter relay will be energized so long as the output signal from the servo amplifier is appreciable, indicating that the drill head 12 has not been moved exactly to the desired position represented by the information stored by the positions of the contact arms 90a, 91a. As the motor 30 drives the head 12 to the desired position, thereby reducing the output signal of the servo amplifier 74 substantially to zero, the sensitive error relay BER will be de-energized, thereby signifying that the head has halted in the desired position.

The apparatus shown in FIG. 2 for positioning the drill head 12 vertically in accordance with numerical information read from the punched tape 70, and including the punched tape reader 71, the storage means 72, and the servo amplifier 74 are all standard, commercially available components sold by the General Electric Company of Schenectady, N.Y. In view of this, it is believed unnecessary, in the interest of brevity, to describe these components in greater detail. It may be mentioned, however, that instead of the simplified system here illustrated in FIG. 2 and employing a single selsyn device 35, a plurality of such selsyn devices driven through different ratio gears from the lead screw 32 may be employed to produce successively coarser or finer error signals, and to thus enable the head 12 to be positioned precisely to a high degree of accuracy. The use of such coarse and fine selsyn devices is common in positioning systems and well known to those skilled in the art.

While the foregoing description has been directed to a system for positioning the drilling head 12 vertically along the column 29, it is also possible to employ a very similar system for energizing the motor 16 to angularly position the table 11 and the workpiece 14 as successive holes are drilled in the workpiece by advancing motion of the column 29. Since to illustrate this in the present instance would involve duplication of a part of the apparatus and circuits shown for positioning the head 12, automatic table positioning means have not been illustrated.

The general mode of operation of the system thus far described involves the reading of one block of information from the punched paper tape 70 and storage of that information by the stepping switch contact arms 90a, 91a. Following that, the head 12 is moved vertically to a position which agrees with the information stored by the stepping switch arms, and the contacts PR1 and PR2 are opened to disconnect the motor 30, leaving the head stationary in the desired position. Then, the column 29 is advanced and retracted, causing a hole to be drilled by the bit 25 at a predetermined, desired vertical location in the workpiece 14. If as soon as the contacts PR1 and PR2 open, the tape reader 71 is actuated by energization of the clutch coil CC to read the next block from the tape 70, the stepping switch arms 90a, 91a will be re-set to new positions during the time interval in which the column is advancing and retracting. When the column is again retracted, the contacts PR1 and PR2 would be reclosed to let the motor 30 drive the head 12 to the next vertical position.

However, if for any reason the advancing motion of the column 29 is interrupted, and the column returned to its home position (for example to replace a broken bit 25), then the head 12 would move to its next position before the column 29 advanced again. The machining or drilling operation of the first hole would be incomplete. To finish such drilling of the first hole, it would be necessary to back-up or re-thread the punched tape 70 in the reader 71 until the first block of information was about to enter beneath the contact fingers 88. To back-up or re-thread the paper tape in order to locate a particular block of information entails intolerable delay and inconvenience.

In accordance with the present invention, the foregoing difficulties are eliminated by preventing the tape reader 71 from sensing a second block of information and re-setting the storage means until the machining operation, with the movable element or head 12 in a position corresponding to the last-read block, has been entirely completed.

One exemplary arrangement for accomplishing this is schematically illustrated in FIG. 3. The interconnected control components and the advantageous operation which they effect can best be described by the following narration of the sequence of action during normal cycles, and during cycles of operation in which, for some reason, the operation of the machine is interrupted and re-started.

Let it be assumed that the machine is at rest and is about to be put into operation. The switch 81 will be closed and the motor 80 continuously energized by virtue of its connection across voltage supply lines L1, L2 (FIG. 3). The clutch coil CC will be deenergized and the clutch 82 disengaged so that the tape reader 71 will be at rest. Also, the column 29 (FIG. 1) will be in its fully retracted position with the forward and return solenoids FOR and RET deenergized, and with the dog 61 holding the home limit switch LS21 actuated so that the contacts LS21a and LS21b (FIG. 3) will be repectively opened and closed. On the other hand, the limit switches LS22 and LS24 will be deactuated so that the contacts LS22a (FIG. 3) will be closed and the contacts LS24a (FIG. 3) will be open. All other relays and solenoids shown in FIG. 3 will be deenergized.

The tape 70 will have been threaded into the tape reader 71, ready for the reading of the first block of information.

The operator then momentarily depresses a pushbutton cycle start switch causing energization of a cycle start relay CYS through a normally closed emergency stop switch ES. Relay CYS seals in through its normally open contacts CYS1 in series with end-of-run relay contacts HR1. With the pick-up of relay CYS, its normally open contacts CYS3 and CYS4 will close to prepare circuits for future completion, while its normally open contacts CYS2 will close to complete a circuit through normally closed latching relay contacts TFR1 for the reader clutch coil CC.

Energization of the clutch coil CC and engagement of the clutch 82 will result in advancement of the punched tape 70, with the contact fingers 88 (FIG. 2) sensing the combination of holes in each row and appropriately energizing the associated relays in different combinations.

As the reader 71 reads the first block of the numerical information, the stepping switch coils 90 and 91 (FIG. 2) will be energized to step the contact arms 90a, 91a to particular taps on the transformer secondary winding 95a, thereby exciting the stator windings of the selsyn device 35 with a voltage representing in analogue form the desired position of the drilling head 12 which was originally defined by the numerical information on the punched tape 70. While this excitation of the stator windings for the selsyn device 35 thus creates an error signal in the selsyn rotor winding 99 and an output voltage at the terminals 74a of the servo amplifier, the motor 30 is not yet energized to move the drilling head 12 because the contacts PR1 and PR2 are at this time open.

When the punched tape reader 71 senses a code line indicating the end of the first block of numerical information, the relay REL will be momentarily energized upon closure of the cam switch CS. Momentary energization of the relay REL will result in closure of its contacts REL1, thereby completing an energization path for pick-up of the auxiliary relay GR. The latter relay seals in around the contacts REL1 through its own normally open contacts GR1 and normally closed contacts UFR2.

With pick-up of the relay GR, is normally open contacts GR3 close to energize a latching coil LA for a mechanically latched relay TFR. Accordingly, the armature of the relay TFR will be shifted to an actuated position and mechanically held there by a latching finger TFRf. With actuation of the relay TFR, its normally closed contacts TFR1 open, thereby de-energizing the clutch coil CC, disengaging the clutch 82, and immediately stopping the tape reader 71. It will be apparent, therefore, that as soon as the end of a block is read from the punched tape 70, the punched tape reader 71 is de-actuated and ceases its operation.

Moreover, pick-up of the relay GR results in closure of its normally open contacts GR2, thereby completing an energization circuit, through the now closed limit switch contacts LS21b, for a positioning relay PR. Energization of the relay PR results in closure of its contacts PR1 and PR2, so that the head-elevating motor 30 is now energized from the servo amplifier 74, and begins driving the elevating screw 32 (FIG. 1) so as to move the head 12 to the vertical position represented by the numerical information read from the punched tape and stored by the stepping switch contact arms 90a, 91a.

During this time that the motor 30 is moving the head toward the desired position, the output voltage of the servo amplifier 74 will be appreciable, and the error relay BER will be energized, thereby opening its normally closed contacts BER1 and BER2.

When the head 12 reaches the desired position and the output of servo amplifier 74 is reduced to zero to stop the motor 30, the relay BER will be de-energized, thereby closing the contacts BER1 and BER2. Closure of the contacts BER1 will energize the pilot light PL signifying to the operator that the machine is ready to begin its first machining operation.

The operator then depresses a unit start pushbutton switch US, momentarily closing contacts US1 which complete an energization circuit (through the now closed contacts CYS4 and normally closed contacts USTP1) for a unit start relay USR. The latter relay thus picks up, and is sealed in through its normally open contacts USR1 around the start switch contacts US1. So long as the contacts USR 1 and CYS4 are closed, an auxiliary voltage supply line L3 will be connected to the line L1.

With pick-up of the relay USR several events occur. First, relay contacts USR2 close to energize the spindle motor 26 so that the spindle 24 and the drill bit 25 are rotatively driven. Secondly, the traverse solenoid TRAV is energized from the line L3 through the closed limit switch contacts LS22a. Accordingly, the valve plunger 59a (FIG. 1) is shifted to admit pressure fluid to the right of the piston 58, and the ball check valve 48 is unseated or held wide open. Thirdly, a unit forward relay UFR is energized from the line L3 through normally closed contacts ER3, TDi, URR3 and BER2.

With energization of the relay UFR its normally open contacts UFR1 close to energize the forward solenoid FOR so that the valve 44 is conditioned to supply fluid pressure to the right end of the cylinder 41, and the column 29 is advanced toward the workpiece at a rapid traverse rate. Also, when the relay UFR is energized, its normally closed contacts UFR2 open to break the sealing circuit for the auxiliary relay GR. With this, the contacts GR 2 re-open to de-energize the positioning relay PR, and the contacts GR3 re-open to de-energize the latching coil LA. The contacts PR1 and PR2 open to disconnect the motor 30 from servo amplifier 74. This disconnection has no immediate effect, however, since the output of the amplifier 74 had been reduced to zero with the head 12 residing at the desired vertical position. De-energization of the latching coil LA does not affect the open condition of the contacts TFR1, since the relay TFR is mechanically latched in its actuated state.

In review, both the traverse and forward solenoids TRAV and FOR have been energized and the column 29 is being moved rapidly toward the workpiece 14 (FIG. 1). Just prior to the engagement of the bit 25 with the workpiece 14, the dog 62 will actuate the limit switch LS22, thereby opening the contacts LS22a (FIG. 3). This will de-energize the traverse solenoid TRAV so that the valve plunger 59a (FIG. 1) is biased downwardly to vent pressure fluid from the right side of the piston 58. Accordingly, the ball check valve 48 will be re-seated, so fluid leaving the left end of the cylinder 41 must pass through the restricting orifice 56. The velocity of the column movement will be reduced or slowed to a feed rate. The column will advance at the feed rate while the bit 25 drills a hole to the desired depth in the workpiece 14.

As soon as the hole has been drilled to final depth, i.e., the column 29 has reached the end of a complete working stroke, the dog 64 (FIG. 1) will actuate the full depth limit switch LS24, thereby closing the contacts LS24a (FIG. 3). Such closure of the contacts LS24a immediately energizes the coil of a dwell time delay relay TD. This relay has one set of normally closed contacts TDi which are actuated or opened immediately, thereby de-energizing the relay UFR. This opens the contacts UFR1, and de-energizes the forward solenoid FOR so that the valve 44 is neutralized and the column 29 is brought to a halt. The column will dwell at its point of farthest advance during the delay period created by the time delay relay TD.

At the end of such dwell period, the normally open contacts TD1 close to energize a relay URR through the now closed limit switch contacts LS21a.

With energization of the relay URR, it seals in around the contacts TD1 by closure of its own normally open contacts URR1. Secondly, its normally closed contacts URR3 open to prevent energization of the relay UFR as the column 29 starts to retract. Thirdly, when the relay URR picks up and seals in, its normally open contacts URR2 close to energize the return solenoid RET, so that the valve 44 is conditioned to cause the actuator 40 (FIG. 1) to retract the column 29 back toward its home position, and a rapid traverse rate.

Also, at the end of the dwell period when the delayed contacts of the time delay relay TD were actuated, the contacts TD2 closed to energize an unlatching coil ULA associated with the latching relay TFR. With this, the relay TFR is deactuated so that its normally closed contacts TFR1 reclose. Therefore, after the forward motion of the column 29 has been completed and, in fact, after the dwell period at the end of such forward motion has expired, the relay TFR will be deactuated to close the contacts TFR1 and thereby again energize the clutch coil CC through the already closed contacts CYS2.

With this, the clutch 82 is again engaged to establish drive from the motor 80, so that the punched tape 70 is advanced and read by the contact fingers 88, one line at a time. This process of reading the second block of information from the punched tape initiates repositioning of the stepping switch contact arms 90a, 91a, although the error signal which will be induced in the selsyn rotor winding 99 cannot yet cause energization of the motor 30 because the contacts PR1 and PR2 are now open. When the last line in the block information on the punched tape 70 is read, the relay REL will again be momentarily energized, thus momentarily closing the contacts REL1, and causing pick-up of the relay GR. The contacts GR2 will thus again be closed, but the positioning relay PR will not yet be energized because the column 29 has at this time not yet been returned to its home position and the contacts LS21b are therefore still open. Also, when the end of the second block of information is read, the contacts GR3 will be closed to energize the latching coil LA of the relay TFR, actuating the latter to open the contacts TFR1. With this, the clutch coil CC will again be energized to de-actuate or stop the tape reader 71.

When the column 29 began its rapid retracting motion from the full depth position, the limit switch LS24 was immediately de-actuated, and its contacts LS24a opened to de-actuate the time delay relay TD. Thus, the contacts TD1 immediately opened, but the unit return relay URR remained energized through its own sealing contacts URR1. Also, the contacts TDi immediately reclosed, but the unit forward relay UFR remained de-energized because the contacts URR3 were at this time open. Still further, the contacts TD2 opened to de-energize the unlatching coil ULA, but the relay TFR was mechanically held in its unlatched or de-actuated state until the contacts GR3 were closed in response to the tape reader sensing the last line in the second block of numerical information.

As the column 29 returns toward its home position, the limit switch LS22 will be de-actuated by release from the dog 62. Reclosure of the contacts LS22a will have no effect on the velocity of column movement in the retracting direction, as previously explained.

Then, when the column 29 is fully retracted to its home position, the dog 61 (FIG. 1) will again actuate the limit switch LS21. With this, the contacts LS21a (FIG. 3) open to de-energize the unit return relay URR. Its contacts URR2 open to energize the return solenoid RET, so that the column 29 is halted. Also, the contacts URR3 reclose, but the unit forward relay UFR is not immediately energized because the contacts BER2 have been opened as a result of energization of the relay BER by the output signal with the servo amplifier 74 resulting from the voltage induced in the rotor winding 99 as the result of the contact arms 90a, 91a having been repositioned in response to reading of the second block of information from the punched tape while the column was retracting.

As soon as the column reaches its home position and the limit switch LS21 is actuated, its contacts LS21b will be closed. This completes an energization circuit through the now closed relay contacts GR2 for the positioning relay PR, causing the contacts PR1 and PR2 to be closed. With this, servo amplifier 74 is connected to energize the head-elevating motor 30, so that the drilling head 12 is moved vertically toward the second predetermined position defined by the second block of numerical information read from the punched tape 70.

When the drilling head 12 reaches the second desired position and the motor 30 is de-energized as a result of the output signal from the servo amplifier being reduced to zero, the sensitive error relay BER will be de-energized, thereby causing the contacts BER2 to reclose. This results in the energization of the unit forward relay UFR, so that its contacts UFR1 close to energize the forward solenoid FOR. The column 29 thus begins advancing at a rapid traverse rate, to initiate the operating motion for the drilling of a second hole in the workpiece 14.

With the second energization of the relay UFR, a second cycle of operation identical to that described above will occur. Such cycles of operation will repeat over and over, with the head 12 being moved vertically to a desired position, the column 29 being advanced and retracted to drill a hole, and the head then being again re-positioned in response to the next block of numerical information read from the punched tape 70.

While the machine is in operation and undergoing the automatic operation described, a number of difficulties may possibly arise which require the machine to be stopped. For example, as the drilling of a hole is in progress, the bit 25 may break, and thus require replacement. If this should happen, the machine operator or attendant must be able to immediately retract the column 29 in order to change cutting tools.

Whenever the column 29 is advancing toward the workpiece 14 at rapid traverse or feed rates, or when the column is stopped at its final point of farthest advance during a dwelling period created by the time delay relay TD, the operator can cause the column to immediately retract to its home position. All he need do is momentarily depress a normally open emergency return pushbutton switch ERS. This completes a circuit (through normally closed contacts US2 of the start switch US, and through normally closed contacts USTP2 of the unit stop switch) for an emergency return relay ER. The latter is thus picked up and sealed in through its own contacts ER1.

With energization of the relay ER, its normally closed contacts ER3 immediately open to de-energize the unit forward relay UFR, thereby opening the contacts UFR1 and de-energizing the forward solenoid FOR. Secondly, the pick-up of the emergency return relay ER results in closure of its normally open contacts ER2 so that the unit return relay URR is energized and sealed in through its own contacts URR1. This results also in closure of the contacts URR2 so that the return solenoid RET is energized and the hydraulic actuator 40 is caused to return the column 29 at a rapid traverse rate to its home position.

When the column 29 gets back to its home position, the limit switch contacts LS21a will be opened, thereby de-energizing the unit return relay URR, opening the contacts URR2, and de-energizing the solenoid RET. The column 29 will therefore come to a halt in its home position and remain there.

The operator can stop the spindle motor 26 in order to change the drilling bit simply by momentarily depressing the unit stop switch USTP. Momentary opening of contacts USTP1 will result in de-energization of the unit start relay USR, thereby opening the contacts USR1 and isolating the auxiliary line L3 from the main voltage line L1. Contacts USR2 open to stop the spindle motor 26. Also, the contacts USTP2 will be momentarily opened to drop out relay ER. After the drill bit has been changed, the operator need only again press the unit start switch US, thereby causing the relay USR to be picked up and sealed in. With this, the column 29 will begin its advancing motion and proceed with the cycle of operation which was interrupted.

On the other hand, it may not be necessary for the operator to stop the spindle motor 26 after the column has been returned to its home position in response to momentary actuation of the emergency return switch. He can, however, re-initiate the automatic cycle of operation which was interrupted simply by momentarily actuating the unit start switch US, thereby opening the contacts US2 to drop out the emergency return relay ER. This will result in reclosing of the contacts ER3 so that the unit forward relay UFR will be re-energized and its contacts UFR1 closed to energize the forward solenoid FOR. The column 29 will thus begin advancing to repeat the cycle of operation which was interrupted.

In either instance, the actuation of the emergency return switch to interrupt the advancing movement or dwelling of the column 29 cannot cause a given machining operation to remain unfinished. Even though the column 29 is returned to its home position before a hole has been completely drilled in the workpiece 14, the numerical information which is stored by the setting of the stepping switch contact arms 90a, 91a, is not destroyed. Rather, those contact arms 90a, 91a are left at their previous setting, and the tape reader 71 cannot be again actuated so as to destroy that setting until the desired machining operation has been fully completed.

This safeguard against loss of stored information by interruption of the machine's operation is here effected because the relay TFR is mechanically latached in its actuated state when the latching coil LA is energized by closure of the contacts GR3. The latching relay TFR cannot be de-actuated to reclose the contacts TFR1 until its coil ULA is energized, and this can only take place when the contacts TD2 close. As noted above, the contacts TD2 can be closed only in response to energization and timing out of the time delay relay TD. But that relay can never be energized unless the column is advanced to the full depth of drilling and the limit switch contacts LS24a are closed. Thus, any time that the operator interrupts a cycle of operation by depressing the emergency return switch before a given hole has been machined to its full depth, the relay TFR will remain in its latched condition with the contacts TFR1 held open. The clutch coil CC thus can never be energized to make the reader 71 read the next block of information and destroy the previous information stored by the setting of the contact arms 90a, 91a, unless the previous machine operation has been fully completed.

In certain other situations it may be necessary for the operator to shut down the entire machine tool and its associated control circuits. The operator can accomplish this simply by momentarily pressing the emergency stop switch ES. This will result in de-energization of the cycle start relay CYS, and opening of the contacts CYS1, CYS2, CYS3 and CYS4. Opening of the contacts CYS2 immediately de-energizes or prevents subsequent energization of the clutch coil CC, so that the reader 71 is de-actuated or prevented from operating. The contacts CYS4 will also open to break the energization circuit for the unit start relay USR, so that the latter will immediately drop out and disconnect the line L3 from the main voltage line L1. With this, both of the relays UFR and URR will immediately be de-energized, so that the forward and return solenoids FOR and RET will both be de-energized, the valve 44 neutralized, and the column 29 immediately brought to a halt at whatever position it may then have. Also, de-energization of the unit start relay USR will result in opening of the contacts USR2 and stoppage of the spindle motor 26. The emergency stop switch ES terminates all operations of the machine.

To re-start the machine after the defective condition has been corrected, it is only necessary for the operator to press the cycle start switch, causing pick-up of the relay CYS. He then presses the unit start switch US. With this, the spindle motor 26 will again be energized and the column motion will proceed either in a retracting or an advancing direction, from the point at which its motion was terminated. If the operator desires to make the column return immediately to its home position in order to further correct the defective condition, he need only then press the emergency return switch ERS, making the column return to its home position, as previously described.

It should be noted particularly here that when the apparatus is re-started after an emergency stop which occurred before a full advancing stroke was completed, the drilling head 12 will remain in its vertical position. Upon re-starting, the hole to be drilled with the head in that position will be completed. This is accomplished by virtue of the fact that once the column starts advancing from its home position (after vertical positioning of the drilling head 12), the relay TFR will remain latched in its actuated state until the next time that the limit switch LS24a closes, and the dwell relay TD times out to close the contacts TD2. The latter must occur before the unlatching coil ULA can be energized to reclose the contacts TFR1. Thus, upon re-starting of the apparatus by closure of the cycle start switch and pick-up of the relay CYS, closure of the contacts CYS2 will not energize the clutch coil CC because the contacts TFR1 will at this time be open. Therefore, the column must be fully advanced to complete the cycle of operation which was interrupted before the contacts TFR1 can reclose to energize the clutch coil CC and make the reader 71 sense the next block of information on the tape 70.

On the other hand, if the emergency stop switch ES is pressed while the column 29 is retracting, and while the reader 71 is reading the next block of information, the contacts CYS2 will open to stop the reader. When the cycle start switch is again actuated, the reader 71 will resume its operation, because the contacts TFR1 will at this time be closed.

In those situations where, for any reason, it might be necessary to stop the spindle motor 26 and motion of the column 29 without isolating the tape reader 71, the operator can momentarily depress the unit stop switch USTP, opening the contacts USTP1. This will de-energize the relay USR to stop the spindle motor 26, and also make certain that both the relays URR and UFR are de-energized. As a result, the colmn 29 will come to an immediate stop. It can then be returned to its home position by momentarily depressing the unit start US and at the same time depressing the emergency return switch ERS. The unit can then be restarted simply by momentarily depressing the unit start switch US. The same safeguards against the tape reader 71 being actuated to read the next block of information from the tape 70 and to thereby destroy the previously stored information are present. If operation of the machine tool is interrupted before a given machining operation is completed, the drilling head 12 will not be moved from its previously established position.

For completeness, stoppage of the machine tool and its controls at the end of an entire series of operations will be described. After the last block of numerical information has been read from the punched tape 70, and the machine column advanced to drill a hole with the head 12 in a position corresponding to that last block of information, the tape reader clutch coil CC will be energized upon reclosure of the contacts TFR1. The punched tape will contain a row of holes forming an "end-of-run" code H. When the tape reader 71 senses the H code row, the relays RX1, R01 and R81 will be simultaneously and momentarily energized to actuate the relay HR (FIG. 2). As a result, the contacts HR2 (FIG. 3) will be momentarily closed to pick up and seal in the emergency return relay ER. With this, the contacts ESR4 will be closed to shunt the contacts CYS4.

Also, pick-up of the relay HR will result in opening of the contacts HR1, so that the relay CYS will be de-energized, opening the contacts CYS1, 2, 3 and 4. This isolates the clutch coil CC and stops the reader 71. The unit start relay USR remains energized through the contacts ER4 even though the contacts CYS4 open.

At the time the emergency relay ER was energized, its contacts ER3 opened to isolate the unit forward relay UFR, while its contacts ER2 closed in parallel with the already closed contacts URR1, assuring that the unit return relay URR is held energized. Accordingly, the forward solenoid FOR remains de-energized and the return solenoid RET remains energized so that the column 29 continues its retracting motion.

When the column returns to its home position, the contacts LS21a open to de-energize the relay URR. This in turn de-energizes the return solenoid RET, so that the column comes to a halt in its home position. The spindle motor 26 will continue to run, but may be stopped in response to the operator momentarily depressing the unit stop switch to open the contacts USTP1. This de-energizes the relay USR, and isolates the auxiliary voltage line L3 from the line L2 in response to opening of the contacts USR1. Moreover, actuation of the unit stop switch results in momentary opening of the contacts USTP2, so that the relay ER is de-energized, thereby reopening the contacts ER4. Even though the contacts ER3 thus reclose, the unit forward relay UFR cannot at this time be again energized because both the contacts CYS4 and ER4 are opened to disconnect the line L3 from the line L1. The unit has thus been completely stopped in response to the reader 71 sensing an "end-of-run" code from the punched paper tape 70. The relay TFR is latched in its de-actuated state, and the entire circuit is ready to begin another series of operations.

I claim as my invention:

1. In a control system for a machine tool having a positionable element and a reciprocatable element, the combination comprising means for storing information, means for reading successive sets of information into said storing means and destroying the previously stored set of information, means responsive to information in said storing means for moving said positionable element to a corresponding position, means for advancing said reciprocatable element from a home position through a working stroke and then retracting the same, and means for preventing the destruction of one set of information in said storing means until said reciprocatable element has been advanced through a complete working stroke after that one set of information has been stored.

2. In a control system for a machine tool having a positionable element and a reciprocatable operating element, the combination comprising a reader for reading successive rows of coded holes punched in paper tape, a latching relay, means for actuating said relay in response to said reader reading an "end-of-block" code, means for stopping and disabling said reader so long as said latching relay is in its actuated state, means for storing information read by said reader, means for moving said positionable element to a desired position corresponding to said stored information, means responsive to said positionable element reaching a desired position for advancing said operating and retracting said operating element, and means responsive only to said operating element being advanced through a full working stroke for de-actuating said latching relay to thereby start said reader.

3. In a machine tool having a positionable element and a movable operating element, the combination comprising means for reading blocks of numerical information one at a time from a record, means for storing such numerical information from each block, means for moving said positionable element to a predetermined position represented by said stored information, means for moving said operating element through working motion in response to said positionable element reaching each predetermined position, means for actuating said reading means in response to said operating element completing each working motion to thereby destroy the previously stored information and read the next block of information into storage, means for interrupting the working motion of said operating element, means for re-starting said working motion, and means for preventing actuation of said reading means whenever said working motion is interrupted and re-started.

4. In a machine tool having a positionable element and a reciprocatable element advanceable through a working stroke and retractable to a home position, the combination comprising a punched tape reader adapted to sense one at a time successive blocks of numerical information digitally represented on punched tape, means for storing numerical information read from one block by said reader until the successive block is read, means responsive to the complete reading of one block of information and to the reciprocatable element being in its home position for initiating an advancing motion of the latter, means responsive to said reciprocatable element being advanced through a complete working stroke for initiating the operation of said reader to read the next block of information, and means for preventing the actuation of said reader if said reciprocatable element should return to its home position before moving through a complete working stroke.

5. In a machine tool having a positionable element and a reciprocatable element, the combination comprising a reader including means for reading one block of numerical information at a time from a punched tape or the like, means for storing each block of numerical information read by said reader until the next block is read, servo control means for moving said positionable element to predetermined positions corresponding to the numerical information held by said storing means, means for advancing said reciprocatable element when the positionable element reaches one of said predetermined positions, means responsive to said reciprocatable element reaching its fully advanced position for (a) retracting said reciprocatable element and (b) initiating operation of said reader to read the next block of information, means for actuating said servo control means in response to (a) the said next block of information having been fully read and (b) said reciprocatable element being fully retracted, emergency control means for interrupting the advancing movement of said reciprocatable element, and means for preventing operation of said reader until said reciprocatable element is re-started and moved to its fully advanced position.

6. In a drilling machine having a column horizontally reciprocatable toward and away from a workpiece and a drilling head vertically movable along the column, the combination comprising a reader including means for reading one at a time successive blocks of numerical information from a digital record, means for storing each block of information so read until the next block is read, a motor and servo control means responsive to said stored information for moving said head to a desired vertical position corresponding to such information, means for advancing said column through a given stroke toward the workpiece, means for retracting said column back to a home position, means responsive to both (a) said column being in its home position and (b) said head being in a desired position for actuating said advancing means, means responsive to said column fully completing said working stroke for actuating said retracting means, a two state mechanically latched device, means for preventing said reader from operating when said device is in one of its states, means responsive to complete reading of one block of information by said reader to set said latched device in said one state, and means responsive to said column completing said working stroke for setting said latched device to the other of its states.

7. In a machine tool having a positionable element and an operating element together with a reader for successively supplying electrical signals to a servo control system for successively moving said positionable element to desired positions, and further having means to advance and retract said operating element through a working stroke after said positionable element reaches each of said desired positions, that improvement which comprises means for actuating said reader to supply a new set of signals to said control system after said operating element has fully advanced through a working stroke, and means for preventing actuation of said reader if the advancing movement of said positionable element is interrupted before the latter has fully advanced through a working stroke.

8. In a machine tool having a positionable element, an operating element, a reader, a servo control system responsive to sets of electrical signals successively supplied by said reader for successively moving said positionable element to desired positions, and means to advance and retract said operating element through a working stroke after said positionable element reaches each of said desired positions, that improvement which comprises means for de-energizing said reader after the latter has supplied one complete set of electric signals to said servo control system, and mechanically latched means for preventing re-energization of said reader until said operating element has fully advanced through one working stroke.

References Cited in the file of this patent

UNITED STATES PATENTS

| | | |
|---|---|---|
| 2,710,934 | Senn | June 14, 1955 |
| 2,741,732 | Cunningham | Apr. 10, 1956 |
| 2,835,042 | Tandler et al. | May 20, 1958 |
| 2,876,650 | Sangster | Mar. 10, 1959 |
| 2,901,927 | Morgan | Sept. 1, 1959 |

OTHER REFERENCES

"How Numbers Control," The Machinist Magazine, pp. 2196–2200, December 10, 1954.